United States Patent
Johnson et al.

(10) Patent No.: US 7,111,301 B1
(45) Date of Patent: Sep. 19, 2006

(54) REQUEST AND COMPLETION QUEUE LOAD BALANCING

(75) Inventors: Stephen B. Johnson, Colorado Springs, CO (US); Christopher J. McCarty, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 702 days.

(21) Appl. No.: 09/972,330

(22) Filed: Oct. 5, 2001

(51) Int. Cl.
G06F 9/46 (2006.01)
G06F 3/06 (2006.01)

(52) U.S. Cl. ...................................... 718/105; 710/52
(58) Field of Classification Search ........ 718/100–104, 718/105; 710/52
See application file for complete search history.

(56) References Cited

U.S. PATENT DOCUMENTS

| | | | |
|---|---|---|---|
| 5,437,032 A | 7/1995 | Wolf et al. ................. | 395/650 |
| 5,671,365 A * | 9/1997 | Binford et al. ............. | 710/100 |
| 5,872,972 A | 2/1999 | Boland et al. ............. | 395/672 |
| 6,269,390 B1 | 7/2001 | Boland ....................... | 709/100 |
| 6,449,701 B1 * | 9/2002 | Cho ............................ | 711/154 |
| 6,721,874 B1 * | 4/2004 | Le et al. ..................... | 712/218 |
| 6,725,296 B1 * | 4/2004 | Craddock et al. ........... | 710/52 |

* cited by examiner

Primary Examiner—Meng-Al T. An
Assistant Examiner—Camquy Truong
(74) Attorney, Agent, or Firm—Christopher P. Maiorana PC (57) ABSTRACT

An apparatus comprising a first circuit, a second circuit, and a third circuit. The first circuit may be configured to generate a request count in response to a request head pointer and a request tail pointer. The second circuit may be configured to generate a completion count in response a completion head pointer and a completion tail pointer. The third circuit may be configured to prioritize an interrupt in response to the request and completion counts.

16 Claims, 5 Drawing Sheets

REQUEST AND COMPLETION QUEUE LOAD BALANCING

FIELD OF THE INVENTION

The present invention relates to a method and/or architecture for implementing queue load balancing generally and, more particularly, to a method and/or architecture for implementing hardware and/or embedded firmware for queue load balancing in controllers.

BACKGROUND OF THE INVENTION

Conventional integrated circuit (i.e., chip) input/output (IO) controllers use multi-processor designs that include an input/output processor (IOP) and one or more context manager (CTX) processors. The context managers include the processor and all of the dedicated hardware components of the bus (or protocol) channel. The IOP and each of the CTX processors include dedicated sets of firmware. The IOP (i) receives Message Passing Technology (MPT) request messages from a host operating system (OS) device driver, (ii) performs some processing on the messages, and (iii) transmits the messages to the CTX processors. The context managers handle the dedicated bus protocol (i.e., SCSI, Fibre Channel, Serial ATA, etc.) of the chip. In a dual channel (i.e., dual bus) design, there is a context manager dedicated to each channel.

The OS and the IOP communicate via a set of dedicated system request and system reply first in, first out registers (FIFOs) that are included in the IO controller. In a dual channel controller there is a dedicated set of the system request FIFOs and system reply FIFOs for each peripheral computer interconnect (i.e., PCI, PCI-X, PCI-X DDR, etc.) function. Each PCI function has a one to one relation with a CTX channel: PCI function 0 is dedicated to channel 0 and PCI function 1 is dedicated to channel 1. The IOP receives pointers to messages that are posted by the OS on the system request FIFOs and presents the pointers to the corresponding CTX processor.

Each of the context managers has a dedicated set of inter-processor (IP) queues that are used for communication between the context manager and the IOP. The context managers do not communicate between each other, but only communicate with the IOP. When the IOP has completed processing a request message from the OS, the IOP sends the message to the CTX by posting the message on the inter-processor IO request queue. When the CTX has completed processing the message (or IO), the CTX replies back to the IOP with the status of the IO via the inter-processor IO completion queue. The IOP (i) receives replies from each of the context managers via the IO completion queues, (ii) performs some cleanup, and (iii) sends the status back to the OS via the system reply FIFO.

Figures 1, 1A:
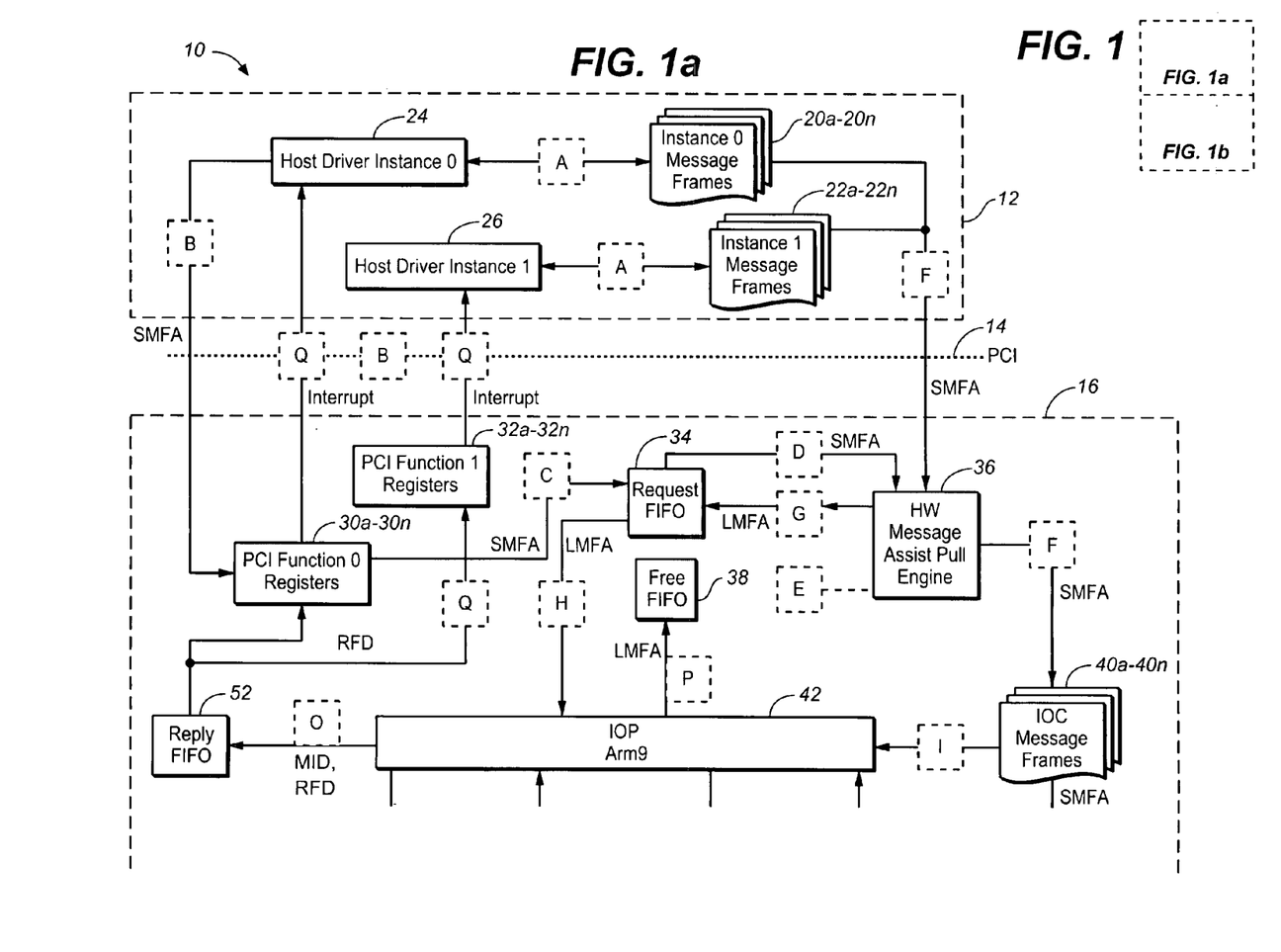
FIG. 1 is a block diagram of a conventional multi-processor controller circuit.
Figure 1B:
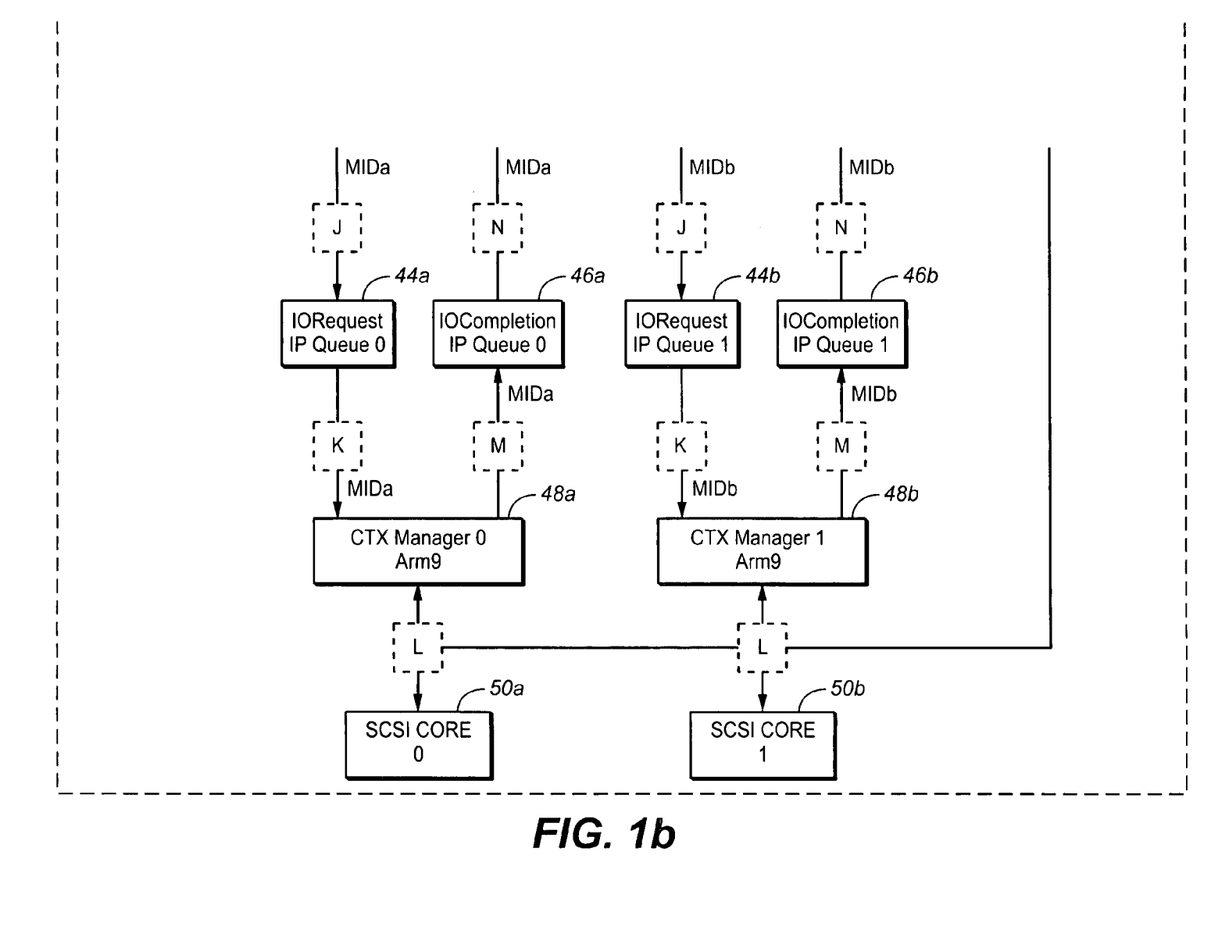

Referring to FIG. 1, a detailed block diagram illustrating a conventional OS driver and IO controller circuit 10 is shown. The circuit 10 includes an OS driver 12, a PCI bus 14, and an IO controller 16. The host OS device driver 12 is coupled to the IO controller 16 via the PCI bus 14. The OS driver 12 includes a first plurality of message frames 20a–20n, a second plurality of message frames 22a–22n, a first host interface 24, and a second host interface 26. The controller 16 includes a first plurality of PCI function registers 30a–30n, a second plurality of PCI function registers 32a–32n, a request FIFO 34, a message assist engine 36, a free FIFO 38, a plurality of message frames 40a–40n, an IOP 42, a first inter-processor queue that includes an IO request register 44a and an IO completion register 46a, a second IP queue that includes an IO request register 44b and an IO completion register 46b, a first CTX manager 48a, a second CTX manager 48b, a first SCSI core 50a, a second SCSI core 50b, and a reply FIFO 52.

The following steps describe the flow of an IO message between the OS device driver 12, the IOP 40 and the CTX managers 48:

Step A: The host OS driver 12 generates a SCSI (or other appropriate protocol) IO message in the host address space 20.

Step B: The host OS driver 12 posts a system message frame address (SMFA) to the PCI function request register 30 via the host interface 24 and the bus 14.

Step C: The PCI function request register 30 presents the SMFA to the request FIFO 34.

Step D: The request FIFO 34 presents the SMFA to the message assist engine 36.

Step E: The message assist engine 36 waits for a local message frame address (LMFA) in the local message frame 40 to become free.

Step F: The message assist engine 36 presents (i.e., direct memory addresses) the system message frame SMFA to the local message frame 40.

Step G: The message assist engine 36 writes the LMFA to the request FIFO 34.

Step H: The IOP 42 polls the interrupt status register for the request queue (i.e., the free FIFO 38) for a new request and receives the LMFA.

Step I: The IOP 42 examines the message header function to determine the type of message addressed by the LFMA. When the message is an SCSI IO request and the message is tagged as a request, the message is assigned a Qtag.

Step J: The IOP 42 posts a message index (MID) on the inter-processor IO request queue 44.

Step K: The CTX 48 polls an internal interrupt status register (i.e., the IO request queue 44) for a new request (i.e., MID).

Step L: The CTX 48 writes the message index MID into a context lookup table and writes a copy of the message to the SCSI core IO bucket 50.

Step M: The CTX 48 completes the IO by posting the unmodified MID on the IO completion queue 46.

Step N: When an error in the IO flow is indicated, the CTX 48 sets an exception bit in the MID indicating the message frame 40 has error status data. The IOP 42 polls the IO completion queue 46 interrupt status register and receives the MID.

Step O: When successful IO flow is indicated, the IOP 42 posts an unmodified message context to the reply FIFO 52 using a function bit in the MID to determine which function to implement.

When an error in the IO flow has been indicated, the IOP 42 presents (i.e., direct memory accesses) a reply frame to a host reply buffer and posts an RFD to the reply FIFO 52.

Step P: The IOP 42 frees the LMFA in the free FIFO 38.

Step Q: The host OS driver 12 receives an interrupt message (INTERRUPT) for a reply.

The IOP 42 performs an intermediary function between the OS driver 12 and the CTX managers 48a and 48b. During a normal mode of operation, the IOP 42 (i) continually receives IO requests from the OS 12, (ii) presents the IO requests to the CTX managers 48, (iii) receives IO completions from the CTX managers 48, and (iv) presents the IO completions to the OS 12.

The IOP 42 includes firmware that is polling based. The IOP 42 firmware has a tight polling loop that polls the IOP 42 interrupt status register. The IOP 42 firmware checks the bits in the IOP 42 interrupt status register in order of priority. When a particular bit is set in the IOP 42 interrupt status register, the IOP 42 performs the corresponding task.

However, some specific tasks (or interrupts) (i.e., system request FIFO interrupt and the inter-processor IO completion interrupt) frequently have problems. When the IOP 42 reads the interrupt status register, both the request and the completion bits in the interrupt status register can be set. The IOP 42 firmware is priority based. The IOP 42 firmware first determines the status of the request FIFO 34 and then determines the status of the completion queue registers 46. The IO controller 16 will start all the pending IO functions on the FIFO 34 before completing any of the IO functions on the completion queue 46. However, the controller 16 can have more IO functions to complete than to start (i.e., the completion queue and the request queue IO loads are unbalanced). Conventional controllers (i) start new IO requests before the completed IO messages (or functions) are finished, (ii) ignore the relative loads of the completed and the requested IO functions, and (iii) hinder overall performance and IO throughput.

It would be desirable to have an architecture and/or method for controllers that (i) dynamically balances request and completion queuing and/or (ii) efficiently determines IO request and completion priorities based on load.

SUMMARY OF THE INVENTION

The present invention concerns an apparatus comprising a first circuit, a second circuit, and a third circuit. The first circuit may be configured to generate a request count in response to a request head pointer and a request tail pointer. The second circuit may be configured to generate a completion count in response to a completion head pointer and a completion tail pointer. The third circuit may be configured to prioritize an interrupt in response to the request and completion counts.

The objects, features and advantages of the present invention include providing a method and/or architecture for implementing hardware and/or embedded firmware for controllers that may provide (i) balanced request and completion load queuing, (ii) dynamic IO request and completion prioritization based on load, (iii) improved performance, (iv) improved overall IO throughput, and/or (v) improved overall parallelism between the OS driver and the IO controller.

BRIEF DESCRIPTION OF THE DRAWINGS

These and other objects, features and advantages of the present invention will be apparent from the following detailed description and the appended claims and drawings in which:

FIGS. 3(a–b) are flow charts illustrating operations of the circuit of FIG. 2;

DETAILED DESCRIPTION OF THE PREFERRED EMBODIMENTS

Figure 2:
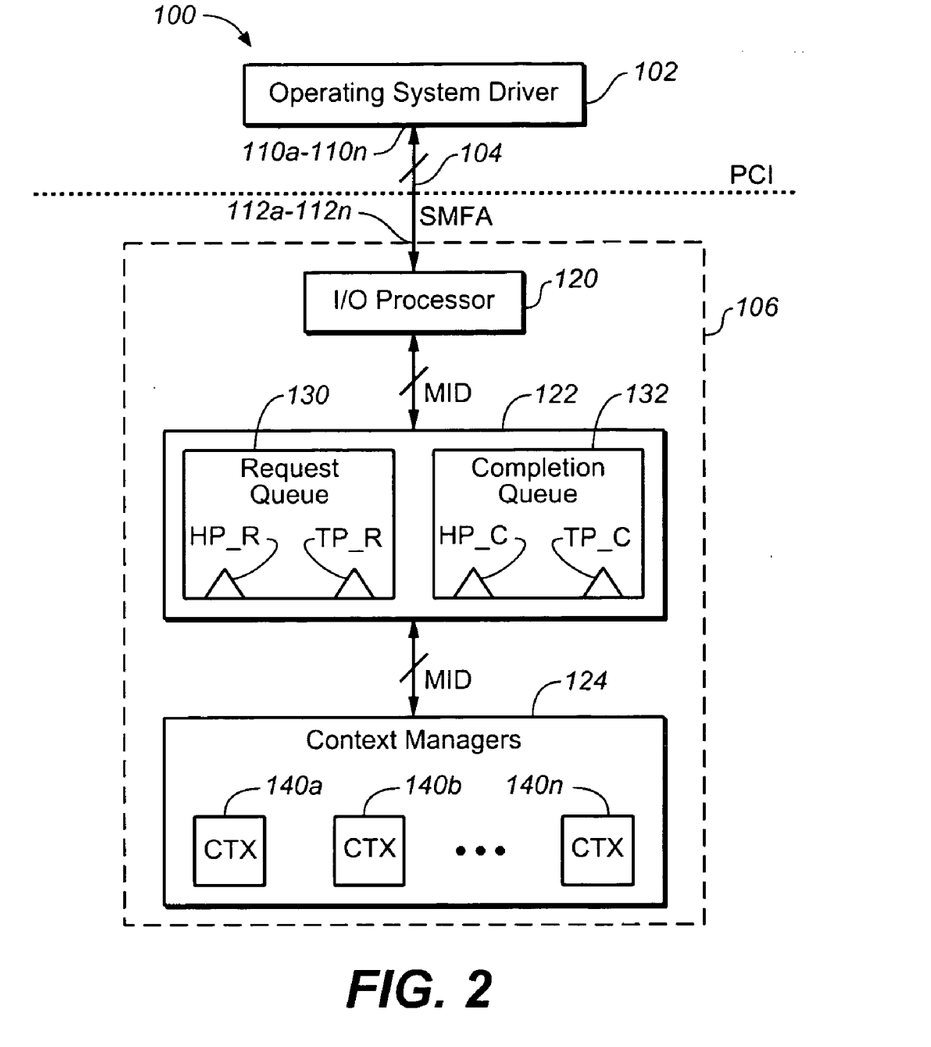
FIG. 2 is a block diagram of a preferred embodiment of the present invention.

Referring to FIG. 2, a block diagram illustrating a circuit 100 is shown in accordance with a preferred embodiment of the present invention. The circuit 100 may be implemented as a multi-processor controller circuit. The circuit 100 generally comprises a circuit 102, a bus 104 and a circuit 106. The circuit 102 may be coupled to the circuit 106 via the bus 104. The circuit 102 may have one or more input/outputs 110a–110n that may receive/present a signal (e.g., SMFA) via the bus 104. The circuit 106 may have one or more input/outputs 112a–112n that may receive/present the signal SMFA via the bus 104. The circuit 102 may be implemented as an operating system (OS) driver. The circuit 102 may be implemented similarly to the IO driver 12. In one example, the bus 104 may be implemented as a PCI bus. However, other bus types (or bus protocols) (e.g., PCI-X, PCI-X DDR, SCSI, Fibre Channel, Serial ATA, IB MPT (InfiniBand), etc.) may be implemented accordingly to meet the design criteria of a particular application. The signal SMFA may be a system message frame address that may be generated in response to an IO message (or function) in the circuit 102. The signal SMFA is generally a multi-bit digital signal.

The circuit 106 may be implemented as an input/output (IO) controller. The circuit 106 may comprise software, hardware and/or embedded firmware implemented within PCI bus (or other appropriate bus) based controllers. The circuit 106 generally comprises a circuit 120, a circuit 122, and a circuit 124. The circuit 120 may be coupled to the circuit 122 via a first plurality of interconnections. The circuit 124 may be coupled to the circuit 122 via a second plurality of interconnections. The circuit 120 may be implemented as an IO processor (IOP) circuit. The circuit 122 may be implemented as a queue circuit comprising a request queue 130 and a completion queue 132. The circuit 124 may be implemented as a context manager (CTX) circuit comprising a number of context managers 140a–140n. The circuit 124 may be implemented with a CTX 140 for each channel of the bus 104. The circuit 120 may receive/present a signal (e.g., MID) to/from the circuit 122. The circuit 122 may receive/present the signal MID to/from the circuit 124. The signal MID may be a message index that may be generated in response to the signal SMFA. The signal MID is generally a multi-bit digital signal.

The circuit 100 may provide better performance and overall IO throughput than conventional IO controllers. The circuit 100 may provide balanced request and completion load queuing and dynamic IO request and completion prioritization based on IO message (or function) loading. The circuit 100 may be configured to finish completed IO messages (or functions) before starting any new IO messages (or functions). The circuit 100 may be configured to improve overall parallelism between the OS driver circuit 102 and the IO controller circuit 106 when compared to conventional controllers. The circuit 100 may have better system workload balance than conventional controllers.

The request queue 130 generally comprises a head pointer (e.g., HP_R) and a tail pointer (e.g., TP_R). The completion queue 132 generally comprises a head pointer (e.g., HP_C) and a tail pointer (e.g., TP_C). The head pointers HP_R and HP_C and the tail pointers TP_R and TP_C are generally stored in hardware registers. The processor (e.g., IOP 120 or CTX 140) sending (e.g., presenting) the signal MID may control the respective tail pointer TP_R or TP_C and the processor (e.g., IOP 120 or CTX 140) receiving the signal MID may control the respective head pointer HP_R or HP_C.

The request queue 130 and the completion queue 132 are generally circular. The locations of the head pointers HP_R and HP_C and the tail pointers TP_R and TP_C may be monitored by the controller 106. When the head pointers HP_R and HP_C and/or tail pointers TP_R and TP_C are at the end of the respective queues 130 and 132, the head pointers HP_R and HP_C and/or the tail pointers TP_R and TP_C may be set to the beginning of the respective queue.

Figure 3A:
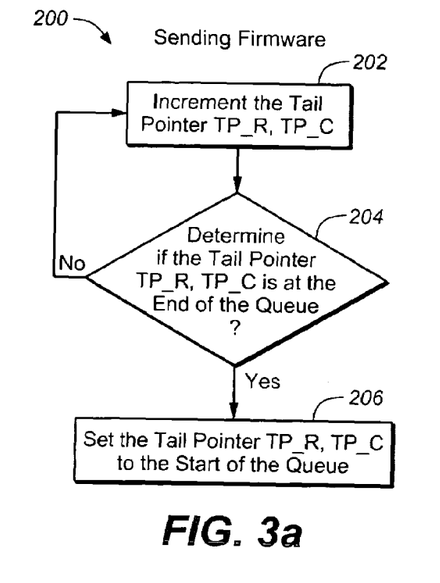

Referring to FIG. 3*a*, a flow diagram illustrating an example of a sending (e.g., presenting) operation 200 of the circuit 100 is shown. Firmware in the sending circuit (e.g., the firmware in the circuit 120 and the circuit 124) generally increments the tail pointers TP_R and TP_C (e.g., block 202). The firmware in the circuit 120 and the circuit 124 may monitor the location of the tail pointers TP_R and TP_C (e.g., block 204) in the respective queues 130 and 132. When the tail pointers TP_R and TP_C are at the end of the respective queues 130 and 132, the firmware in the circuit 120 and the circuit 124 may set the tail pointers TP_R and TP_C to the start of the respective queues 130 and 132 (e.g., block 206, wrap the tail pointers TP_R and TP_C). When the tail pointers TP_R and TP_C are not at the end of the respective queues 130 and 132, the firmware in the circuit 120 and the circuit 124 may increment the tail pointers TP_R and TP_C (e.g., the block 202 may be repeated).

Figure 3B:
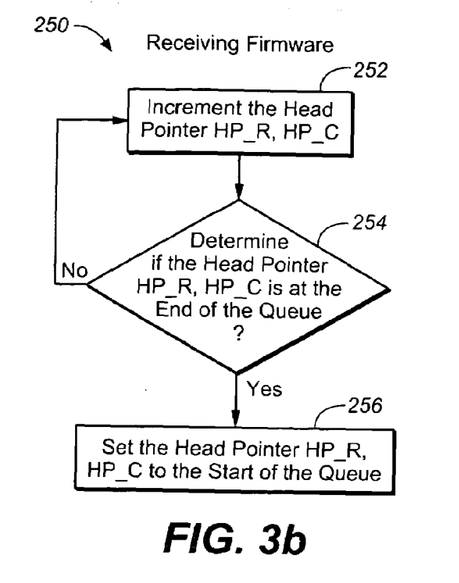

Referring to FIG. 3*b*, a flow diagram illustrating an example of a receiving operation 250 of the circuit 100 is shown. Firmware in the receiving circuit (e.g., the firmware in the circuit 120 and the circuit 124) generally increments the head pointers HP_R and HP_C (e.g., block 252). The firmware in the circuit 120 and the circuit 124 may monitor the location of the head pointers HP_R and HP_C (e.g., block 254) in the respective queues 130 and 132. When the head pointers HP_R and HP_C are at the end of the respective queues 130 and 132, the firmware in the circuit 120 and the circuit 124 may set the head pointers HP_R and HP_C to the start of the respective queues 130 and 132 (e.g., block 256, wrap the head pointers HP_R and HP_C). When the head pointers HP_R and HP_C are not at the end of the respective queues 130 and 132, the firmware in the circuit 120 and the circuit 124 may increment the head pointers HP_R and HP_C (e.g., the block 252 may be repeated).

In one example, hardware in the circuit 100 may be configured to automatically wrap the head pointers HP_R and HP_C and the tail pointer TP_R and TP_C. Firmware in the circuit 100 may be configured to increment the head pointers HP_R and HP_C and the tail pointers TP_R and TP_C. In another example, hardware in the circuit 100 may be configured to auto-increment the head pointers HP_R and HP_C and the tail pointers TP_R and TP_C when write and/or read operations are performed to and/or from the queue circuits 130 and 132.

Figure 4:
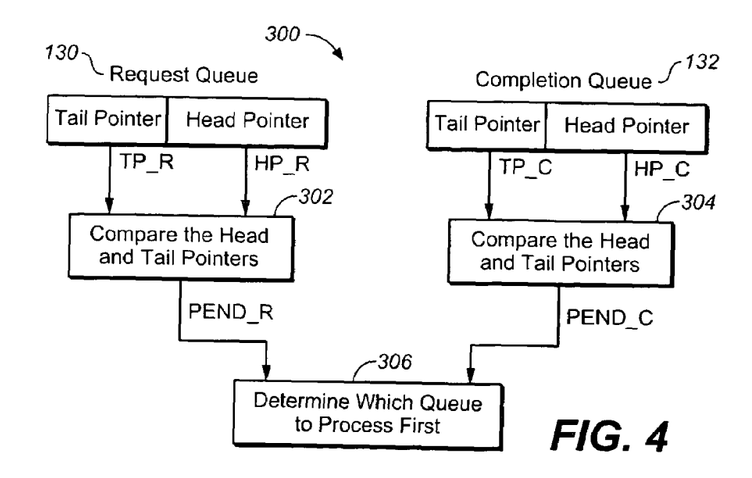
FIG. 4 is a flow chart illustrating another operation of the circuit of FIG. 2.

Referring to FIG. 4, a flow diagram illustrating an operation 300 in accordance with the present invention is shown. The circuit 100 may comprise a circuit (or block) 302, a circuit (or block) 304, and a circuit (or block) 306. The circuits 302, 304 and 306 may be implemented as comparison circuits. The comparison circuits 302, 304 and 306 may be implemented in software, firmware, and/or hardware (e.g., registers) to meet the design criteria of a particular application.

The request queue 130 may present the tail pointer TP_R and the head pointer HP_R to the comparison circuit (or block) 302. The circuit 302 may be configured to generate a comparison (e.g., difference) signal between the request tail pointer TP_R and the request head pointer HP_R (e.g., PEND_R). The signal PEND_R may be a count that may correspond to the number of pending IO functions in the request queue 130 (e.g., the load of the request queue 130).

The completion queue 132 may present the tail pointer TP_C and the head pointer HP_C to the comparison circuit (or block) 304. The circuit 304 may be configured to generate a comparison (e.g., difference) signal between the completion tail pointer TP_C and the completion head pointer HP_C (e.g., PEND_C). The signal PEND_C may be a count that may correspond to the number of pending IO functions in the completion queue 132 (e.g., the load of the completion queue 132).

The request comparison circuit (or block) 302 may present the signal PEND_R to the circuit (or block) 306. The completion comparison circuit (or block) 304 may present the signal PEND_C to the circuit (or block) 306. The circuit 306 (described below in connection with FIGS. 5 and 6) may be configured to determine which of the queues 130 and 132 the controller 106 processes first. The circuit 306 may be configured to prioritize an interrupt in the circuit 106 in response to the signals PEND_R and PEND_C. The circuit 306 may set a higher priority to the queue (e.g., the queues 130 and 132) having the higher load (e.g., having the higher of the signals PEND_R and PEND_C).

Figure 5:
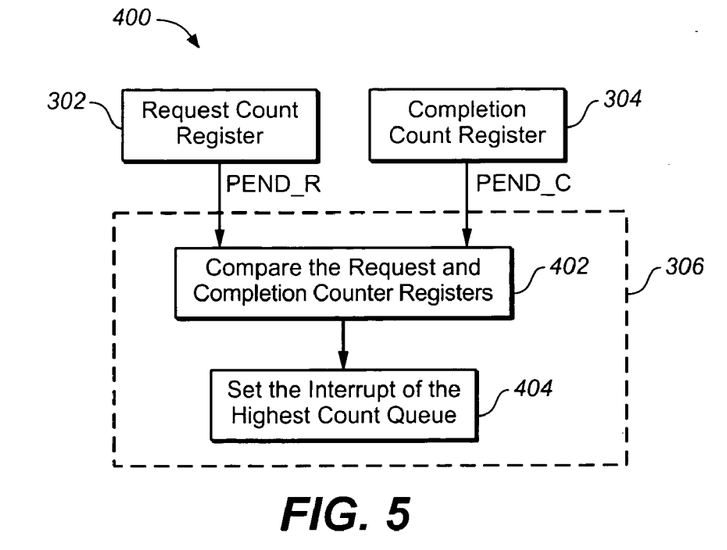
FIG. 5 is a detailed flow chart illustrating a section of the operation of FIG. 4.

Referring to FIG. 5, a flow diagram illustrating an operation 400 of the present invention is shown. In one example, the circuit (or block) 306 comprises a block 402 and a block 404. The circuit 306 may be configured to compare the signals PEND_R and PEND_C (e.g., block 402). The circuit 106 may be configured to set an interrupt bit of the signal MID in response to the larger of the signals PEND_R and PEND_C (e.g., block 404). The circuit 106 may be configured to set an interrupt bit of the signal MID in response to the request queue 130 or the completion queue 132 having the larger number of pending IO messages (or functions) (e.g., the request queue 130 or the completion queue 132 having the higher load).

Figure 6:
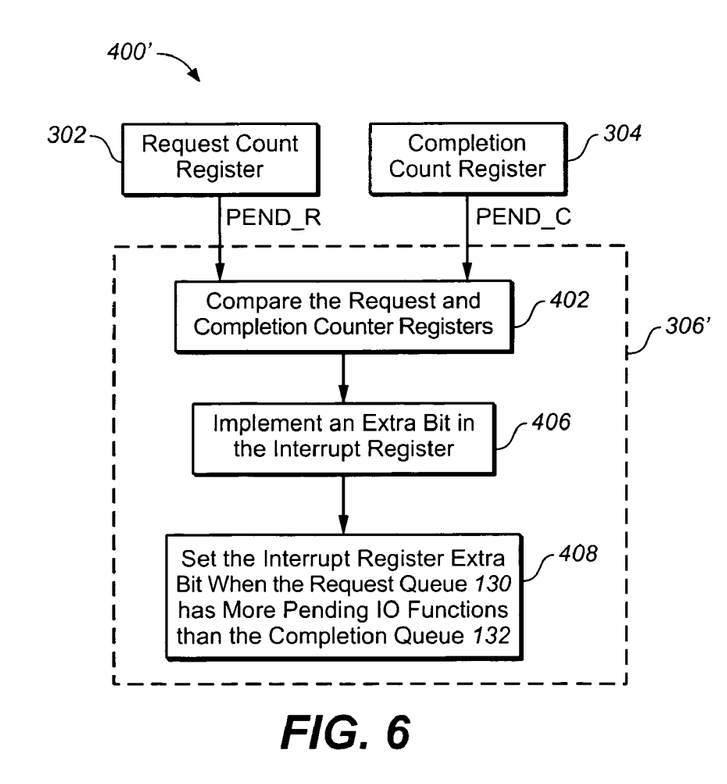
FIG. 6 is a flow chart illustrating an alternative section of the operation of FIG. 4.

Referring to FIG. 6, a flow diagram illustrating an alternative operation 400' of the present invention is shown. The circuit (or block) 306' generally comprises the block 402, a block 406 and a block 408. The circuit 106 may implement an additional (e.g., extra) bit in an interrupt status register (e.g., block 406) when compared to a conventional interrupt status register. The extra bit in the interrupt status register may be set when the request queue 130 has more pending IO messages (or functions) than the completion queue 132 (e.g. block 408, when the signal PEND_R is greater than the signal PEND_C). The extra bit in the interrupt status register is generally not set when the completion queue 132 has more pending IO messages (or functions) than the request queue 130 (e.g. when the signal PEND_C is greater than the signal PEND_R). When the circuit 100 is implemented using the operation shown in FIG. 6, the bits in the signal MID that are set when the signal TP_R and the signal HP_R are not equal may be unchanged. Similarly, the bits in the signal MID that are set when the signal TP_C and the signal HP_C are not equal may be left unchanged.

The present invention may provide improved efficiency when compared to conventional controllers. The present invention may provide hardware, firmware, and/or software based features to the queues 130 and 132 (and the respective FIFOs) that may assist load balancing decision firmware in the IOP 120. The present invention may provide improved balancing of the load between the IOP 120 request FIFO and the completion queue 132 when compared to conventional controllers. The IOP 120 may be configured to quickly determine the queue (e.g., the request queue 130 or the completion queue 132) that has the highest load and process the queue with the highest load first. The present invention may provide totally automated load balancing in software, hardware and/or firmware. The present invention may be configured to interrupt the FIFO and/or the queue with the highest load.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to generate a request count in response to a request queue having a request head pointer and a request tail pointer, wherein said request count corresponds to a number of pending I/O functions in said request queue;
    a second circuit configured to generate a completion count in response to a completion queue having a completion head pointer and a completion tail pointer, wherein said completion count corresponds to a number of pending I/O functions in said completion queue; and
    a third circuit configured to (i) set an interrupt for said request queue or for said completion queue (ii) process said pending I/O functions in said request queue when said request count is a higher value than said completion count and (iii) process said pending I/O functions in said completion queue when said completion count is a higher value than said request count to dynamically balance an IO load between said request queue and said completion queue.

2. The apparatus according to claim 1, wherein said apparatus is configured to (i) generate said request count in response to a difference between said request head pointer and said request tail pointer and (ii) generate said completion count in response to a difference between said completion head pointer and said completion tail pointer.

3. The apparatus according to claim 1, wherein said third circuit is configured having an extra bit in an interrupt register and said extra bit is set when said request count is higher than said completion count.

4. The apparatus according to claim 1, wherein said apparatus is further configured to balance said IO load between a request FIFO and said completion queue.

5. The apparatus according to claim 1, wherein said apparatus comprises an operating system driver and an input/output controller and said apparatus is configured to improve parallelism between said operating system driver and said input/output controller.

6. The apparatus according to claim 5, wherein said operating system driver is coupled to said input/output controller via a bus and said bus is selected from the group consisting of a SCSI, PCI, PCI-X, PCI-X DDR, Fibre Channel, IB MPT (InfiniBand), and Serial ATA bus.

7. The apparatus according to claim 1, wherein said apparatus is configured to automatically wrap said request and completion head pointers and said request and completion tail pointers.

8. The apparatus according to claim 1, wherein said apparatus is configured to auto-increment said request and completion head pointers and said completion tail pointers when write and/or read operations are performed to and/or from a request queue circuit and a completion queue circuit.

9. An apparatus comprising:
    means for generating a request count in response to a request queue having a request head pointer and a request tail pointer, wherein said request count corresponds to a number of pending I/O functions in said request queue;
    means for generating a completion count in response to a completion queue having a completion head pointer and a completion tail pointer, wherein said completion count corresponds to a number of pending I/O functions in said completion queue;
    means for setting an interrupt for said request queue when said request count is a higher value than said completion count;
    means for processing said pending I/O functions in said request queue when said request count is a higher value than said completion count to dynamically balance an IO load between said request queue and said completion queue;
    means for setting an interrupt for said completion queue when said completion count is a higher value than said request count; and
    means for processing said pending I/O functions in said completion queue when said completion count is a higher value than said request count to dynamically balance an IO load between said request queue and said completion queue.

10. A method of prioritizing request and completion functions comprising the steps of:
    (A) generating a request count in response to a request queue having a request head pointer and a request tail pointer, wherein said request count corresponds to a number of pending I/O functions in said request queue;
    (B) generating a completion count in response to a completion queue having a completion head pointer and a completion tail pointer, wherein said completion count corresponds to a number of pending I/O functions in said completion queue;
    (C) setting an interrupt for said request queue when said request count is a higher value than said completion count; and
    (D) processing said pending I/O functions in said request queue when said request count is a higher value than said completion count to dynamically balance an IO load between said request queue and said completion queue;
    (E) setting an interrupt for said completion queue when said completion count is a higher value than said request count; and
    (F) processing said pending I/O functions in said request queue when said completion count is a higher value than said request count to dynamically balance an IO load between said request queue and said completion queue.

11. The method according to claim 10, wherein step (A) further comprises generating a difference between said request head pointer and said request tail pointer and step (B) further comprises generating a difference between said completion head pointer and said completion tail pointer.

12. The method according to claim 10, wherein said interrupt is set for balancing said IO load between a request FIFO and said completion queue.

13. The method according to claim 10, wherein step (C) further comprises:

setting an extra bit in an interrupt register when said request count is higher than said completion count.

14. The method according to claim 10, wherein said method further comprises improving parallelism between an operating system driver and an input/output controller.

15. The method according to claim 10, wherein said method further comprises automatically wrapping said request and completion head pointers and said request and completion tail pointers.

16. The method according to claim 10, wherein said method further comprises auto-incrementing said request and completion head pointers and said completion tail pointers when write and/or read operations are performed to and/or from a request queue circuit and a completion queue circuit.

* * * * *